(12) United States Patent
Plumptre

(10) Patent No.: US 7,185,585 B2
(45) Date of Patent: Mar. 6, 2007

(54) CONTAINER CRUSHER

(75) Inventor: David Aubrey Plumptre, Droitwich (GB)

(73) Assignee: Francis Henry Lee, Wilmslow (GB)

( * ) Notice: Subject to any disclaimer, the term of this patent is extended or adjusted under 35 U.S.C. 154(b) by 0 days.

(21) Appl. No.: 11/220,190

(22) Filed: Sep. 1, 2005

(65) Prior Publication Data
US 2006/0144259 A1    Jul. 6, 2006

Related U.S. Application Data

(63) Continuation of application No. PCT/GB2004/00828, filed on Feb. 27, 2004.

(30) Foreign Application Priority Data
Mar. 1, 2003  (GB) .................................. 0304703.2

(51) Int. Cl.
B30B 9/32 (2006.01)
(52) U.S. Cl. ...................... 100/902; 100/49; 100/214; 100/218; 100/282; 100/295
(58) Field of Classification Search ................. 100/43, 100/48, 49, 52, 94, 95, 98 R, 98 A, 249, 100/214, 218, 240, 265, 266, 282, 288, 295, 100/299, 902; 72/313, 354.8, 352
See application file for complete search history.

(56) References Cited

U.S. PATENT DOCUMENTS

| | | | |
|---|---|---|---|
| 2,700,355 A * | 1/1955 | Erb ............................. 72/313 |
| 3,086,418 A * | 4/1963 | Levine ......................... 83/635 |
| 4,817,521 A | 4/1989 | Katada et al. | |
| 5,448,946 A | 9/1995 | Laux | |

FOREIGN PATENT DOCUMENTS

| | | | |
|---|---|---|---|
| DE | 24 14 402 | | 10/1975 |
| DE | 102 09 244 | | 9/2003 |
| JP | 02084300 A | * | 3/1990 |
| JP | 11114957 | | 4/1999 |
| JP | 2002192390 | | 7/2002 |

* cited by examiner

Primary Examiner—Lowell A. Larson
Assistant Examiner—Jimmy Nguyen
(74) Attorney, Agent, or Firm—Michael Best & Friedrich LLP

(57) ABSTRACT

An apparatus for crushing containers includes a die defining an opening, a punch, and a system for displacing the die and punch relative to each other. The punch may be fixed and the die may be moved from a first position spaced apart from the punch such that a container to be crushed can be placed between the punch and die and a second position in which the punch extends into the die opening to define an annular gap between the punch and die opening. The arrangement is such that a container crushed between the die and punch as a result of displacement of the die to the second position is at least in part forced into and deformed within the annular gap.

35 Claims, 13 Drawing Sheets

CONTAINER CRUSHER

RELATED APPLICATIONS

This continuation patent application claims the benefit of PCT/GB2004/000828, filed on Feb. 27, 2004, which claims the benefit of British Patent Application No. 0304703.2, filed on Mar. 1, 2003. The entire contents of both prior applications are hereby incorporated by reference.

BACKGROUND

The present invention relates to an apparatus for crushing containers, for example beverage or food containers formed from plastics, cardboard or light metal.

A large proportion of household waste is in the form of food and beverage containers. This proportion has increased significantly as a result of the increasing use of liquid containers manufactured from plastics materials, for example polyethylene terephthalate (PET). Such containers although very light in weight occupy a substantial space even when empty. At household waste disposal sites such containers can be compacted along with other waste, and in transit from collection points to the household waste disposal sites waste material can be compacted in waste collection trucks incorporating hydraulic crushing arrangements. Within households however there are no satisfactory means available for efficiently crushing disposable containers.

Metallic containers when crushed generally remain in the configuration into which they have been crushed. Unfortunately, simple crushing of containers fabricated from materials such as PET is ineffective as most such containers, although readily crushed, simply spring back to close to their original shape when the crushing force is removed.

Many proposals have been made for crushing non-metallic containers. Generally these rely upon heating the container to be crushed to a temperature at which its physical characteristics are such that the containers do not spring back to their original shape when the crushing force is released. For example, published international patent application WO 00/21725 describes an apparatus for crushing bottles of thermoplastic material by initially filling the bottles with a small amount of steam and then applying a relatively small force manually. In order to avoid a user contacting a heated bottle, a removable holding pot is provided under the apparatus into which the bottle is pressed. This holding bottle does not however take any part in the crushing process itself but merely retains the crushed bottle in a safe manner.

The above-mentioned published patent application makes specific reference to safety issues which arise in apparatus relying upon heating of the container to be crushed. Additional disadvantages arise however given that using heat to facilitate the crushing process requires significant energy inputs and time delays. As a result devices relying upon the application of heat have not found favour.

DE 241402 describes a method and device for reducing the volume of plastic jars by means of a die and ram. After the compression phase the body is forced through an opening provided in the die.

SUMMARY

It is an object of the present invention to obviate or mitigate the problems outlined above.

According to the present invention, there is provided an apparatus for crushing containers, comprising a die defining an opening, a punch, and means for displacing the die and punch relative to each other between a first relative position in which the die and punch are spaced apart such that the container to be crushed can be placed between them and a second relative position in which the punch extends into the die opening to define an annular gap between the punch and the die opening, the arrangement being such that a container crushed between the die and punch as a result of their displacement to the second relative position is at least in part forced into and deformed within the annular gap.

As a result of the crushed bottle being forced into and deformed within the annular gap, sufficient plastic deformation is induced in the fabric of the crushed container to ensure that the crushed container does not spring back significantly when the crushing force is removed. As no heat is required, the safety and energy consumption issues associated with prior art devices relying upon heating are avoided. It is the case that a substantial force must be applied to the container to achieve the necessary degree of plastic deformation, but that force can be delivered using relatively simple components.

Preferably the punch is fixedly mounted on a frame, and the die is displaceable relative to the frame and punch, for example by arranging the punch in an upper portion of the apparatus with the punch extending downwards, and vertically displacing the die beneath the punch. The frame may support a fixedly mounted release peg toward which the die is displaced as it is moved downwards away from the punch, the release peg being positioned so that it enters the die opening and pushes out any crushed container retained within the opening.

A container to be crushed may be held by retaining walls extending around the space defined between the punch and die. One of those walls may be defined by an openable door which provides user access for the insertion of a container to be crushed and user access for removal of a crushed container. Appropriate interlocks can be provided to prevent operation of the device with the door open.

The annular gap defined between the die opening and the punch when the punch extends into that opening may be between 5 mm and 15 mm, for example between 5 mm and 10 mm or between 10 mm and 15 mm. The opening itself may have an internal diameter from 30 mm to 80 mm, for example between 50 mm and 70 mm. The size of the gap and die will be to an extent a function of the size and material of the containers to be crushed.

The edge of the die opening facing the punch is preferably of rounded form so as to facilitate material forming the container being dragged into the annular gap. The annular gap may taper downwards in the direction in which the punch enters the opening, for example as a result of the opening tapering downwards, the punch tapering downwards, or both the punch and opening being tapered. The punch and die opening may be of circular cross-section or could be of generally square cross-section, preferably with rounded corners.

In order to assist the retention of the base of a container to be crushed, a surface of the die which extends around the die opening may define formations which match typical container base dimensions.

In order to resist the tendency of containers to be displaced sideways relative to the punch, the punch may support a retractable guide peg which may be inserted into a container to be crushed and which retracts as the die and punch move to the second relative position. The retractable guide peg may support radially extending retractable container retaining bars. The position of the guide peg relative to the punch may be sensed, and the relative movement between the punch and die may be controlled in dependence upon the sensed relative position of the guide peg. For example, if at the beginning of a crushing process the peg is at least partially retracted, the apparatus may be controlled so that the punch does not enter the opening. With such an arrangement an attempt to crush for example a metal can with an off centre aperture which could not receive the retractable guide peg would proceed up to the point at which the can was significantly crushed but before the mechanism attempted to force the can into the die opening. Appropriate relative position detectors may be provided to enable appropriate control of the mechanism, for example a detector which detects the penetration of the punch to a predetermined depth within the die.

The spacing between the die and punch when in the first relative position may be dimensioned to accommodate the largest containers normally encountered in domestic situations. The die and punch may be displaceable to an intermediate holding position before a container to be crushed is inserted to make the handling of relatively small containers more efficient.

The punch and die may be relatively displaced by at least one electric motor driving an array of winches to which wires linking the die and punch are connected. A single motor may drive four winches each connected by a respective wire to a displaceable carrier of either the die or the punch, each wire extending from the respective winch around a pulley supported on the carrier to a support adjacent the winch. Such an arrangement halves the maximum tension in each wire. In order to balance the tension in the wires, at least two of the wires may be interconnected and displaceable relative to the support. For example, the two interconnected wires may define a loop which extends freely around a surface of relatively large radius such that the wires can slide relative to that surface. The loop of wire may be spring biased towards a central position relative to the support surface or the loop may be prevented from excessive displacement relative to the support by an appropriate mechanical device.

BRIEF DESCRIPTION OF THE DRAWINGS

Embodiments of the present invention will now be described, by way of example, with reference to the accompanying drawings, in which:

FIG. 14 is a sectional view through the punch and die illustrated in FIG. 4;

FIG. 15 is a perspective view of a square punch and die arrangement:

FIG. 16 is a schematic view of a wire loop extending around a sliding surface for achieving approximately even load distribution between the winch systems connected to the die of the first embodiment; and FIG. 17 is a sectional view through a punch assembly.

DETAILED DESCRIPTION

Figure 1:
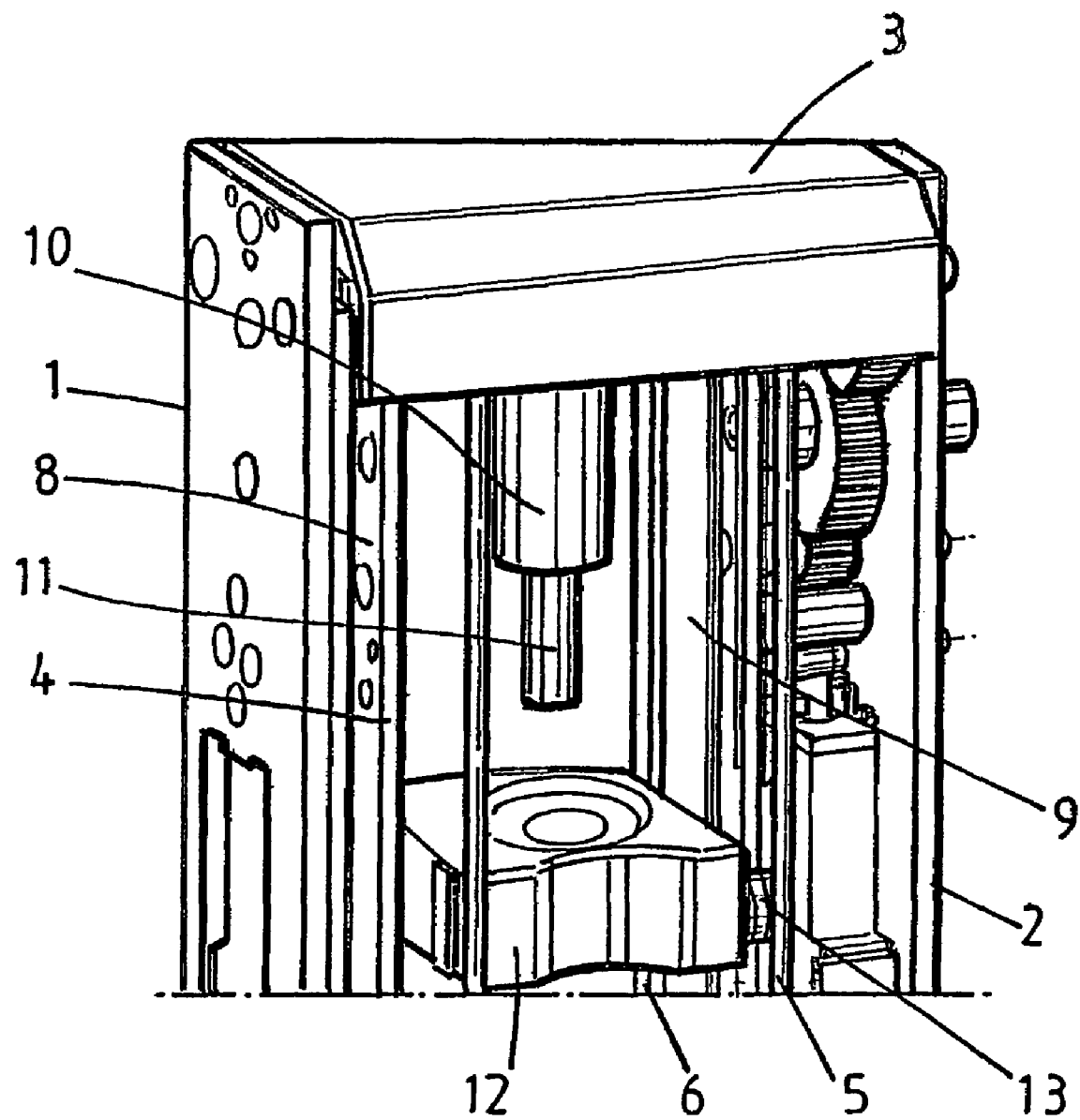
FIG. 1 is a schematic perspective view of an upper portion of components of an embodiment of the present invention.

Referring to FIGS. 1 to 5 of the drawings, the illustrated assembly would of course in use be enclosed within an appropriate casing including a door which would be opened to gain access to the crushing arrangement. The casing has been omitted from the drawings to expose operational components for the purposes of describing the functions of those components.

The apparatus comprises a framework located within the outer casing (not shown), that framework comprising two main side plates 1, 2 linked by a cover plate 3 and a base plate (not shown). Four vertically extending rods hold the cover plate 3 and base together, three of those rods being shown in FIG. 1 and identified by reference numerals 4, 5 and 6. A fourth rod 7 is not visible in FIG. 1 but is shown in for example FIGS. 3 and 4. A pair of inner side plates 8 and 9 extend parallel to the main side plates 1 and 2.

A punch 10 projects downwards from the cover plate 3 and supports a retractable guide peg 11. The punch 10 is fixed in position but the guide peg 11 is retractable into the punch if it is pushed upwards against a biasing force provided by a spring (not shown) within the punch 10.

A die 12 defined in a square-section carrier is vertically displaceable beneath the punch 10, the die 12 supporting four rollers 13 which run against side edges of the plates 8 and 9. As is best appreciated from FIG. 3, the die 12 defines an opening 14 which is aligned with the punch 10 and has a rounded upwardly facing edge. Surface formations 15 arranged around the upper edge of the opening define portions of square and circular outlines adapted to receive the base of containers of standard dimensions.

Figure 3:
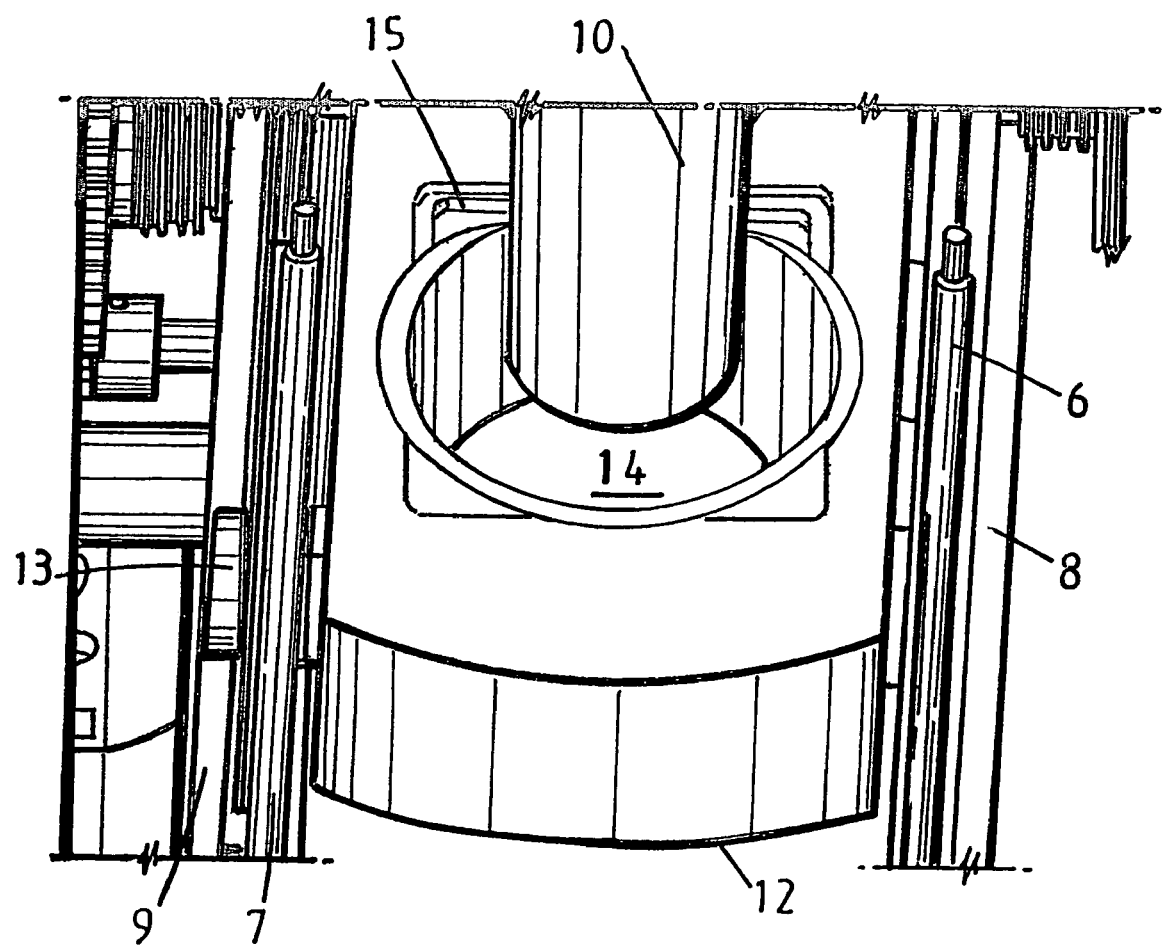
FIG. 3 is a perspective view from above of components of the apparatus of FIGS. 1 and 2.
Figure 4:
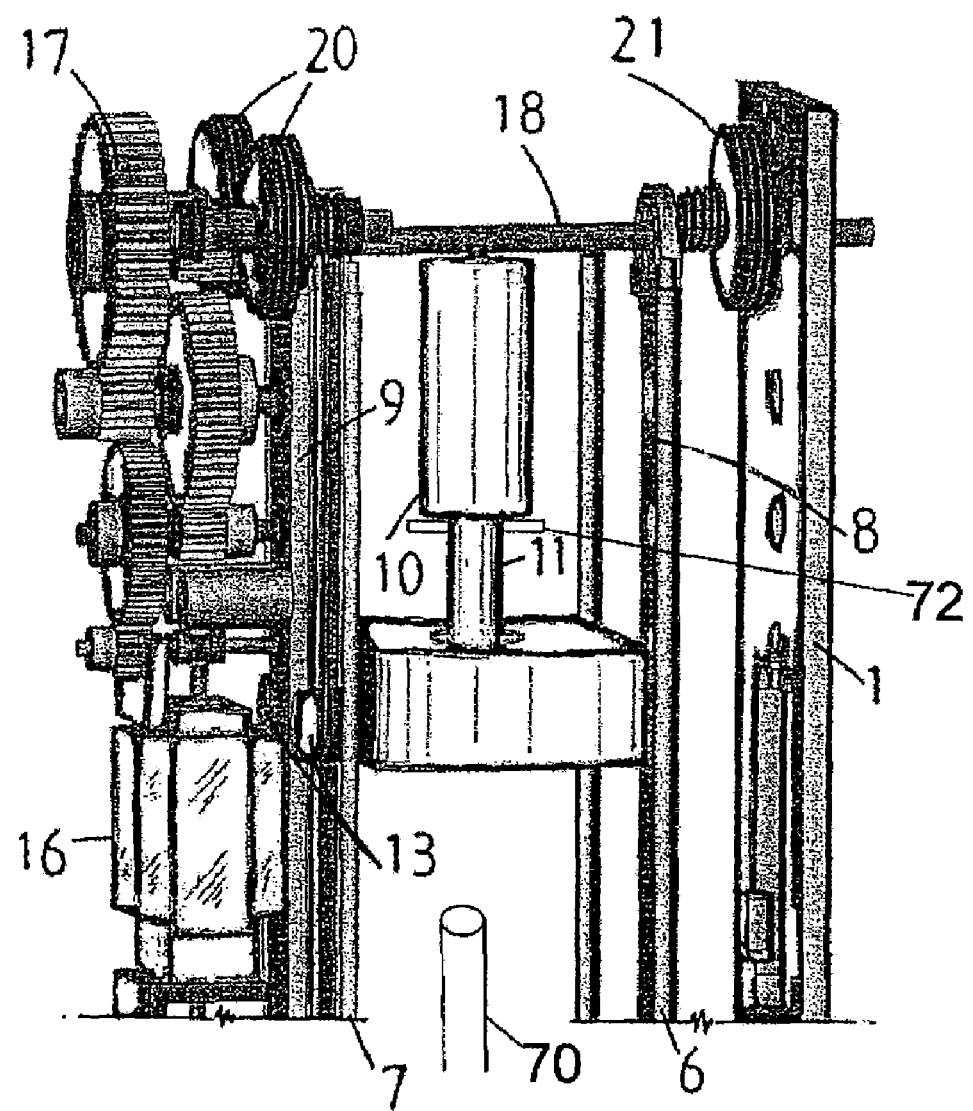
FIG. 4 shows details of a drive mechanism of the apparatus shown in FIGS. 1 to 3.

The die 12 is vertically displaceable from a position in which it is lowered onto the base (not shown) and therefore is spaced from the punch to an intermediate position as shown in FIG. 1, to a further intermediate position as shown in FIG. 4 in which the retractable guide peg 11 is seen as entering the opening, and to a further intermediate position as shown in FIG. 3 in which the punch 10 is shown as entering the opening. Although not shown in the drawings, the die 12 can be lifted to a point at which the lower surface of the punch 10 is 40 mm below the upper surface of the die 12. In the illustrated example, the punch 10 is substantially cylindrical and the main wall of the opening 14 is cylindrical, the walls of the punch and opening defining between them an annular gap of uniform width when the punch is fully inserted into the opening.

The base supports a release peg 70 (shown in FIG. 4) aligned with the opening 14 such that when the die 12 is fully lowered the peg projects upwards through the opening so as to dislodge any crushed container within the opening.

In use, the die 12 is lowered onto the base. The door of the outer casing (not shown) is opened and a container to be crushed is placed on the die 12. Generally the container will define an open neck which receives the retractable guide peg 11. The casing door is then closed and the die 12 is elevated. As the die 12 is elevated the container is progressively collapsed until the point at which the retractable guide peg is pushed back into the punch 10. Further raising of the die 12 causes the punch to enter the opening 14. This forces the crushed container body into the gap between the punch 10 and the die 12, ensuring sufficient plastic deformation of the container body that it remains in the crushed state after removal from the crushing apparatus. It has been found that good results are achieved with a punch and die combination where the gap between the outer surface of the punch and the inner surface of the die is between 5 mm and 10 mm.

As the die is raised towards the punch, the force required to lift the die rises to a maximum when the punch is just about to enter the opening 14. It is at this point that the punch drags the container material into the radial gap between the punch and die. Rounding the upper edge of the opening as shown in FIG. 3 reduces the maximum force required.

The greater the radial width of the gap between the punch and die opening, the smaller is the load required to force container material into that gap. If the gap is too wide however the container material is not deformed sufficiently to prevent spring back when it is released. The maximum force can however be optimised if the radial width of the gap tapers downwards in the direction of insertion of the punch into the die. Such tapering is shown in FIG. 14. Tapering of the gap can be achieved by tapering either the opening in the die, or the punch, or both (as shown in FIG. 14). With such tapering the maximum force required to achieve a predetermined deformation of the container material can be reduced.

Tapering the gap between the punch and die also reduces the force required to pull the punch back out of the die. It also reduces the force required to remove the crushed container after the crushing cycle is complete. Typically if the punch tapers more than the die then when the die is pulled down away from the punch the compressed product consistently remains in the die rather than pulling out of the die and remaining attached to the punch. This is preferred as the die continues downward and the crushed container is ejected from the opening in the die by the upwardly extending release peg 70.

In the illustrated embodiment the punch and die have circular cross-sections in horizontal section. Other configurations are possible however. For example both the punch and die could be square (as shown in FIG. 15) or square with rounded corners.

The formations 15 around the upper edge of the opening in the die are in the illustrated embodiment shown as recesses but it would be appreciated that these formations could be raised projections on the upper surface of the die. It will also be appreciated that the die should be fabricated from a material with a hard surface coating to reduce wear and friction.

The retractable guide peg 11 is normally in the position shown in for example FIG. 1 but is fully retracted when the punch has entered the die. The retractable peg 11 is therefore not shown in FIG. 3. The peg 11 performs three functions during a crushing operation. Firstly where it can be positioned so as to extend into the neck of the container to be crushed, it maintains consistent axial compression of the container, preventing it from collapsing sideways or slipping relative to the punch. Secondly, the peg is of such a length that it supports the container partway down its length. In the case of asymmetric containers, such as polyethylene milk bottles, it prevents features such as the handle generally moulded into such containers from collapsing first and causing the container to fold in half rather than collapse axially. If the container were allowed to fold in half then with the top and bottom restrained it has a tendency to be pushed to one side of the die, giving uneven loading during compression. Thirdly, the peg will remain in its lower position until the punch is flush with the die, thereby maintaining sideways restraint until near to the end of the crushing process.

Some containers to be crushed are manufactured from materials which do not spring back after crushing and which therefore do not need to be forced into the die. Metal drinks cans and cardboard cartons are examples of such containers. The device can nevertheless be used with such containers without forcing the container material into the die providing the user does not position the container with the guide peg extending into the container interior but rather rests the end of the guide peg on an upwardly facing end of the container. Providing the guide peg is so positioned, it will be fully retracted into the punch as soon as the upwardly facing end of the container has been raised on the die to the level of the lower end of the punch. Crushing can nevertheless proceed, albeit without the guidance normally provided by the peg 11. The position of the retractable peg 11 relative to the die is sensed and, if the peg is retracted well before the die is level with the bottom end of the punch 10, the machine can be arranged to operate so as to halt elevation of the die 12 before the punch 10 has entered the opening 14. This avoids the risk of damage resulting from an attempt to force for example a strong metal can into the die. Of course, in the event that an attempt is made to crush an object which is too strong for the crushing mechanism, alternative arrangements could be made for preventing damage. For example, a drive motor used to elevate the die 12 could be sized so as to stall before mechanical limits were exceeded, a thermal or current sensing switch then providing a mechanism for cutting off the supply of power to the motor.

Additional arrangements may be provided to support a container to be crushed. Such additional support is useful in particular with polyethylene bottles. Such support could be provided by simple walls (not shown), one of those walls being defined by an inner surface of the access door referred to above.

During compression, some containers have a tendency to roll up onto the punch, creating a deep cupped double-wall structure which is relatively large and tends to stick to the punch. To prevent this happening, the retractable peg 11 could be supplemented with sidebars 72 (as shown in FIG. 4) extending radially outwards from the peg 11 through axial slots in the punch 10. These bars would help to prevent the material of the container being crushed from riding up the outside of the punch. During the final stages of the compression process the guide peg would be pushed upwards to its retracted position either by pressure on the base of the guide peg or by pressure from the die (or crushed material surrounding the top surface of the die) on the radial bars. As an alternative to mounting the radial bars on the guide peg 11, the radial bars could be independently spring-mounted on the punch 10. This would make it possible for the radial bars to be relatively stiff as compared with the peg 11 so that the radial bars would not be deflected so readily.

An advantage of having a fixed position punch 10 and a die 12 that moves up to the punch is that friction between the container being crushed and sidewalls contacted by the container encourages the material to move towards the die rather than to roll up around the punch.

The mechanism used in the described embodiment to lift the die towards the punch will now be described. FIG. 4 shows a motor 16 which drives a main drive gear 17 that in turn drives a shaft 18. The shaft 18 drives gears 19 mounted on one side of the assembly and those gears in turn drive respective spools 20. The other end of the shaft 18 to the gear 17 drives a corresponding set of gears and pair of spools 21, only one of the spools 21 being shown in FIG. 4.

Figure 2:
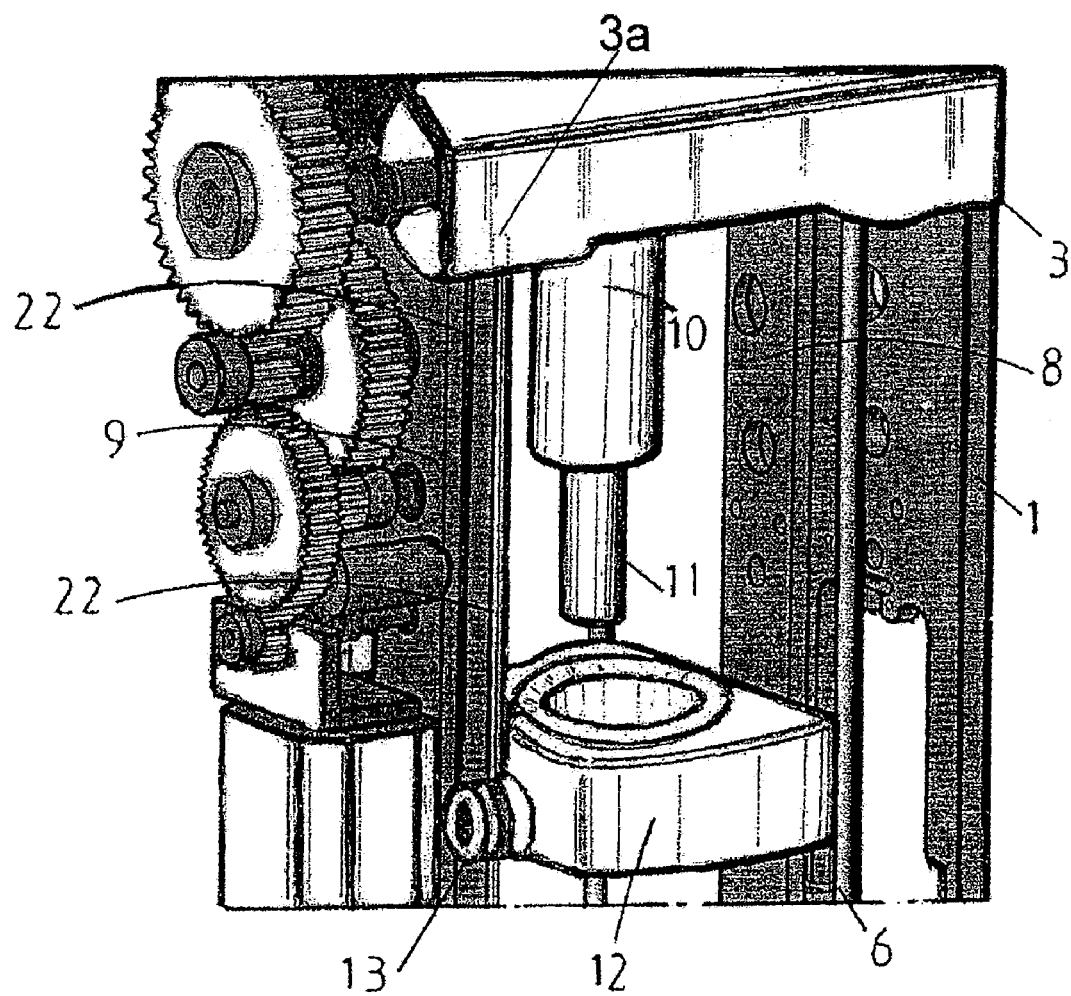
FIG. 2 is a further view of the apparatus of FIG. 1 from the opposite side of the assembly.

All of the spools 20 and 21 are thus driven in synchronism by the single motor 16. Each of the spools is connected to one end of a respective wire. The wire from each spool extends downwards and around a respective one of the rollers 13 and then back up to a fixing point 3a beneath the cover plate 3. Portions 22 of one of the wires are shown in FIG. 2. Thus the rollers 13 act as a pulley block and halve the tension required in each wire to pull the die up against a fixed load. In effect the total load is split between eight different lengths of wire and thus if all the wires are equally loaded the load on each wire is one eighth of the total vertical load on the die 12.

It is desirable to achieve approximately even load distribution between the four winch systems connected to the die 12. Whereas in the above described embodiment each of the four wires is independently fixed at its end remote from the associated spool 20 or 21, two wires on one side of the machine (for example those connected to spools 20) could be independently fixedly connected to the framework of the machine. On the other side of the machine, as shown in FIG. 16, the two wires could be connected together so as to form a loop 82 extending around a sliding surface 80 of relatively large radius which could be for example moulded into the top of the framework. This would enable the loop of wire 82 to move so as to enable the die 12 to tilt slightly and equalise tension in the wires. In order to prevent excessive tilting, the loop of wire 82 could be connected to a spring-mounted component 84 biased towards a central "normal" position or alternatively could simply be prevented from displacement beyond appropriate limits. For example, the loop of wire 82 could be clamped with a pinch bolt retained between spaced-apart abutments after initial assembly, enabling pressure to be applied to the centre of the die so as to cause the die to tilt until the load is evenly distributed between all four winch systems. The pinch bolt would then be clamped onto the wire. The system could then be readily set up for use using wires terminated in a predetermined manner despite the inevitable resultant tolerances.

Figure 5:
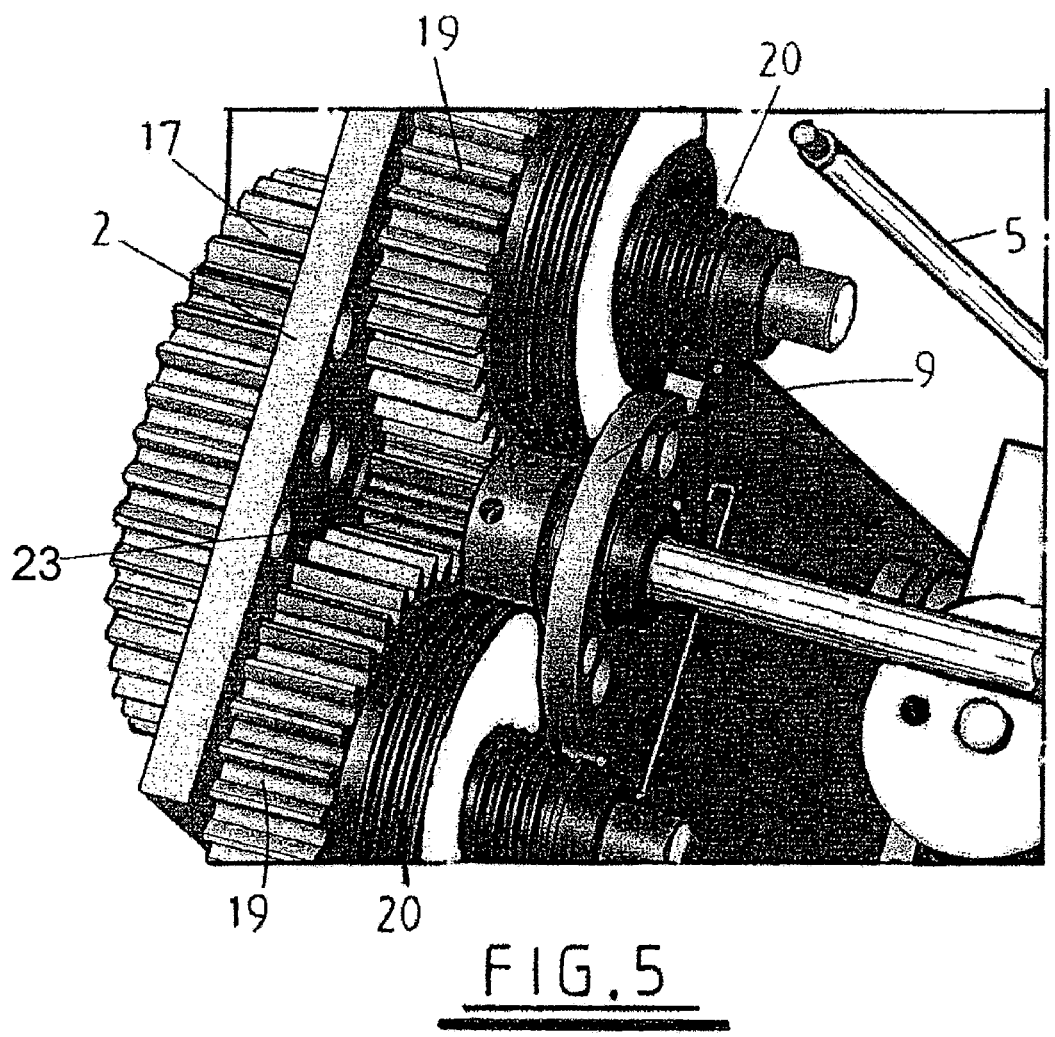
FIG. 5 illustrates details of the gear mechanism shown in FIG. 4.

The nature of the spools 20 (which are identical to the spools 21) can best be appreciated from FIG. 5. Each spool has grooves in its surface to match the diameter of the wire and to ensure that it does not wind the wire on top of itself. The spool is not of constant diameter. This enables the winching system to have a varying mechanical advantage between the load on the gear driving the spool and the load on the winching wire. As mentioned above, in most applications the maximum load is required at the end of the crushing operation where the material is drawn down into the die by the punch. This maximum load can be an order of magnitude higher than the load required at the start of the crushing process and can be up to one half tonne. Having a system with low mechanical advantage at the beginning of the cycle and high mechanical advantage at the end of the cycle ensures that the gear ratio from the motor to the spool can be minimised to give a fast cycle time for a given size of motor and to minimise the size and hence cost of the motor. Typically a motor delivering only 300 Watts can produce a peak load of one half tonne and a cycle time of about 8 seconds by appropriate dimensioning of the spools 20. The grooves in the spool surfaces can also be used to in effect trap the wire against a matching surface in the framework (not shown) so as to prevent accidental misspooling.

The winching arrangement illustrated in the drawings is capable only of raising the die. In addition however some arrangements must be made to lower the die after completion of a crushing operation. This could be achieved using a simple spring arrangement, but a more reliable method would be to have a similar winch system to that used to raise the die to pull the die back down again. The return winch arrangement would not take much load and one spool per side of the machine should suffice. This single spool, if driven by the gear train shown in FIG. 4, could be one third of the diameter of the winching spools used to raise the die because the gear ratio between the shafts could be about 1:3. This much smaller spool would fit into the space between the main winching spools 20 or 21.

A gear 23 on the shaft 18 drives both pairs of winching spools with the same gear ratio. Positioning the gear 23 between the pairs of spools 20, 21 to an extent balances the load from the teeth on each side of the gear so that the resultant forces on the shaft 18 to which the gear 23 is attached are largely torsional and are not transmitted to the bearing supporting the shaft. This is significant because it enables the shaft 18 to be relatively small, making it and the bearings relatively cheap. It also enables a small die return spool as described above to be attached to the shaft without increasing the whole depth of the machine or reducing the size of the four main winching spools.

The gear 17 has the same size teeth as the gears 23 which rotate on the shaft 18 and the gears 19 attached to the spools 20, 21. Thus although gear 17 drives all four spools, there is conveniently a mechanical reduction of about 4:1 between the different gear sets. This means that the load on the gear teeth is even and no particular gear is loaded more than another. Moving down the gear train towards the motor, the gears become progressively smaller with smaller teeth until the motor itself is reached. The illustrated motor is mounted perpendicular to the gear train so as to minimise the distance that it projects sideways from the frame. A different motor design could be used however and ideally the motor would be a "pancake" design mounted with its shaft parallel to the gear shafts. This would avoid the requirement for bevel gears (not shown) and would therefore give a quieter and more efficient gear train. This would also avoid the need for extra motor supports.

It will be appreciated that appropriate interlocks could be provided to prevent the machine from operating in a dangerous manner, for example with the door open, and appropriate control switches may be provided in a conventional manner.

In the illustrated embodiment of the invention, the die and punch are dimensioned such that a container to be crushed is only partially forced into the die, the crushed container being ejected from the die towards the punch after the die and punch are moved apart. It will be appreciated however that the die and punch dimensions could be such that the container to be crushed is forced into and then through the die. This would be a particularly attractive option if the apparatus was mounted over a rubbish bin into which crushed containers would be automatically dropped after being forced through the die. For example the apparatus could be mounted on a wall over a bin, in a work surface over a bin, or in an upper part of a free-standing bin.

In some circumstances, for example fast food outlets, it is necessary to dispense with large volumes of containers of a known uniform size and shape. In such circumstances, an apparatus could have a die and punch sized and shaped to suit the known size and shape of the containers to be crushed. Thus a purpose built apparatus could be incorporated in a large rubbish bin, significantly reducing the space required to store crushed containers.

Figure 6:
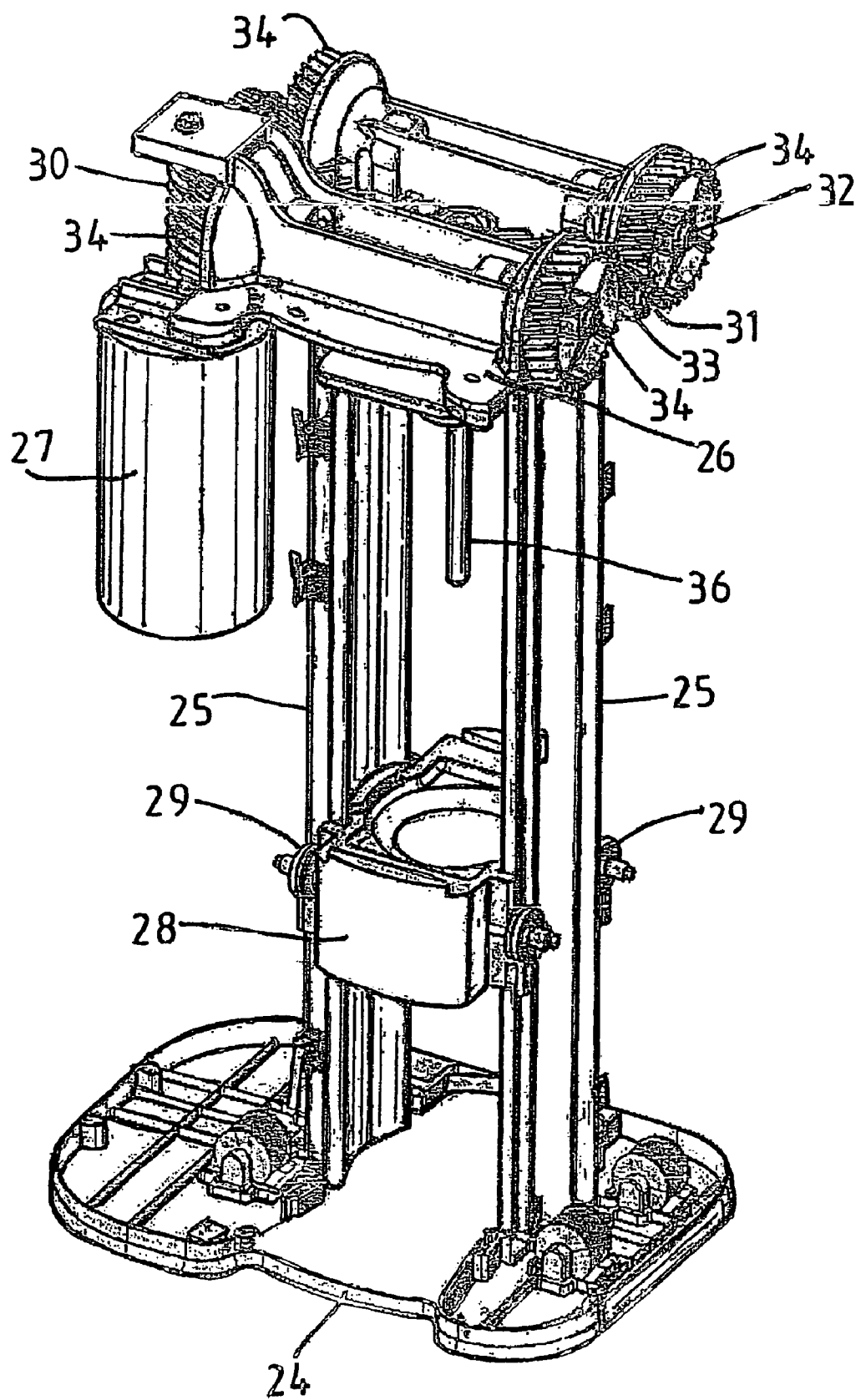
FIG. 6 is a schematic view of components of a second embodiment of the present invention from a first direction.
Figure 7:
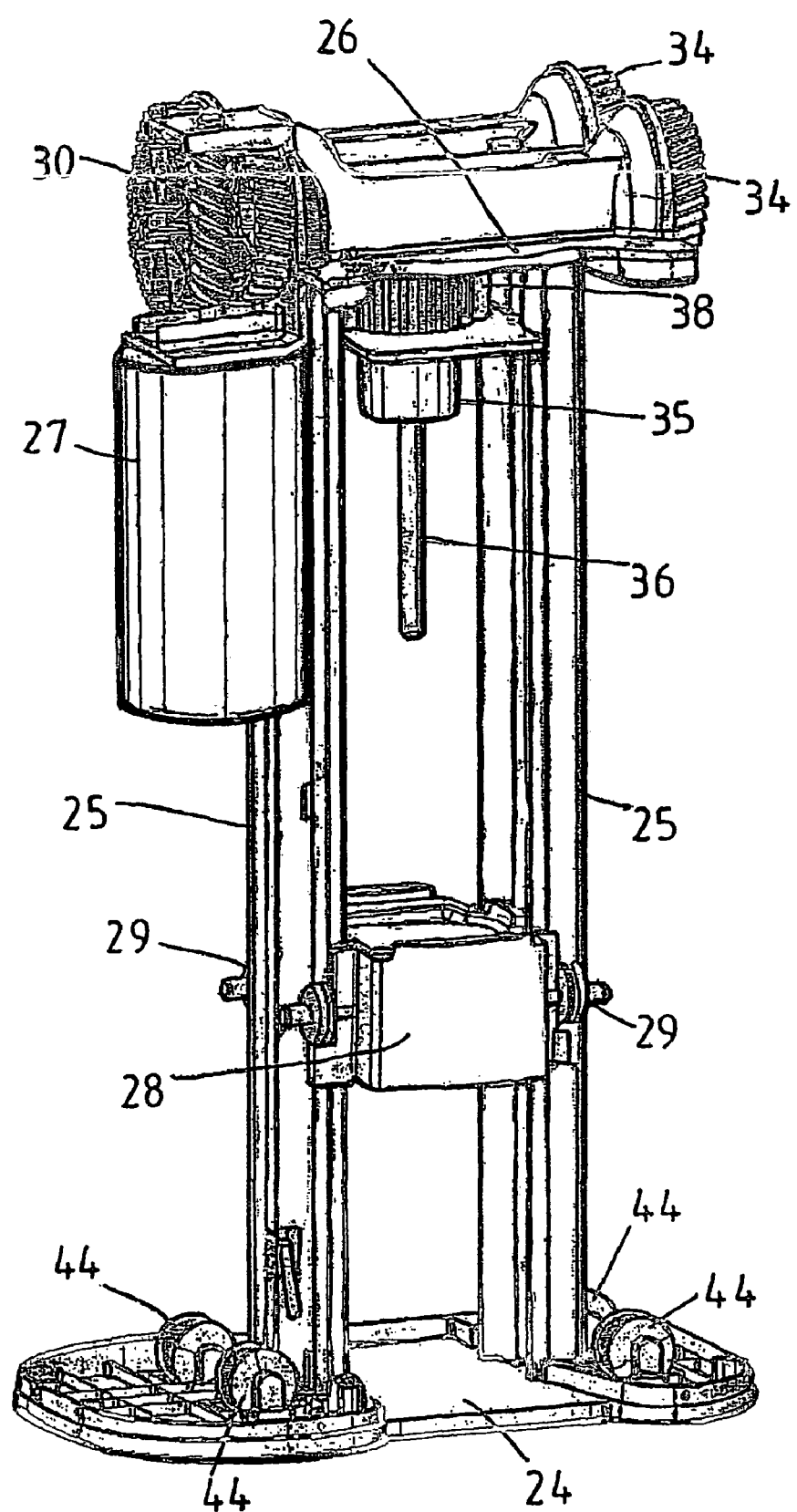
FIG. 7 is a view of the embodiment of FIG. 6 from a different direction.

Referring to FIGS. 6 and 7, a second embodiment of the present invention is illustrated. In many respects this second embodiment has common features with the first embodiment illustrated in FIG. 1 to 5. Accordingly the description of FIGS. 6 to 13 will concentrate on differences between the two embodiments rather than the detail of the second embodiment.

The second embodiment comprises a base plate 24 from which two metal fabrications 25 extend vertically upwards. Upper ends of the fabrications 25 are engaged by an upper plate 26 which supports a winch assembly driven by an electric motor 27. A die carrier 28 runs on rollers 29 that engage edges of the fabrications 25.

The motor 27 drives a worm gear 30 that in turn drives a shaft 31 extending between shafts 32. The shaft 31 carries gears 33 at each of its ends, the gears 33 meshing with gears 34 carried on shafts 32.

A punch 35 extends downwards towards the die carrier and supports a guide peg 36. A crushed container release plate 37 is arranged so that the punch 35 projects through it. The release plate 37 is mounted on arms 38 which extend parallel to the punch 35.

If for example a plastics bottle is placed on the die carrier 28 with the guide peg 36 extending into the neck of the bottle, and the die carrier 28 is then raised, the bottle will be deformed and forced downwards into the die and to an extent upwards around the punch 35. Any tendency of the crushed container to become permanently engaged around the punch 35 is resisted by the resilient release plate 37. In the case of the embodiment illustrated in FIGS. 6 and 7, no release peg is provided on the base 24, although such a release peg could be provided to push a crushed container from within the die as described in the case of the embodiment of FIGS. 1 to 5.

Figure 8:
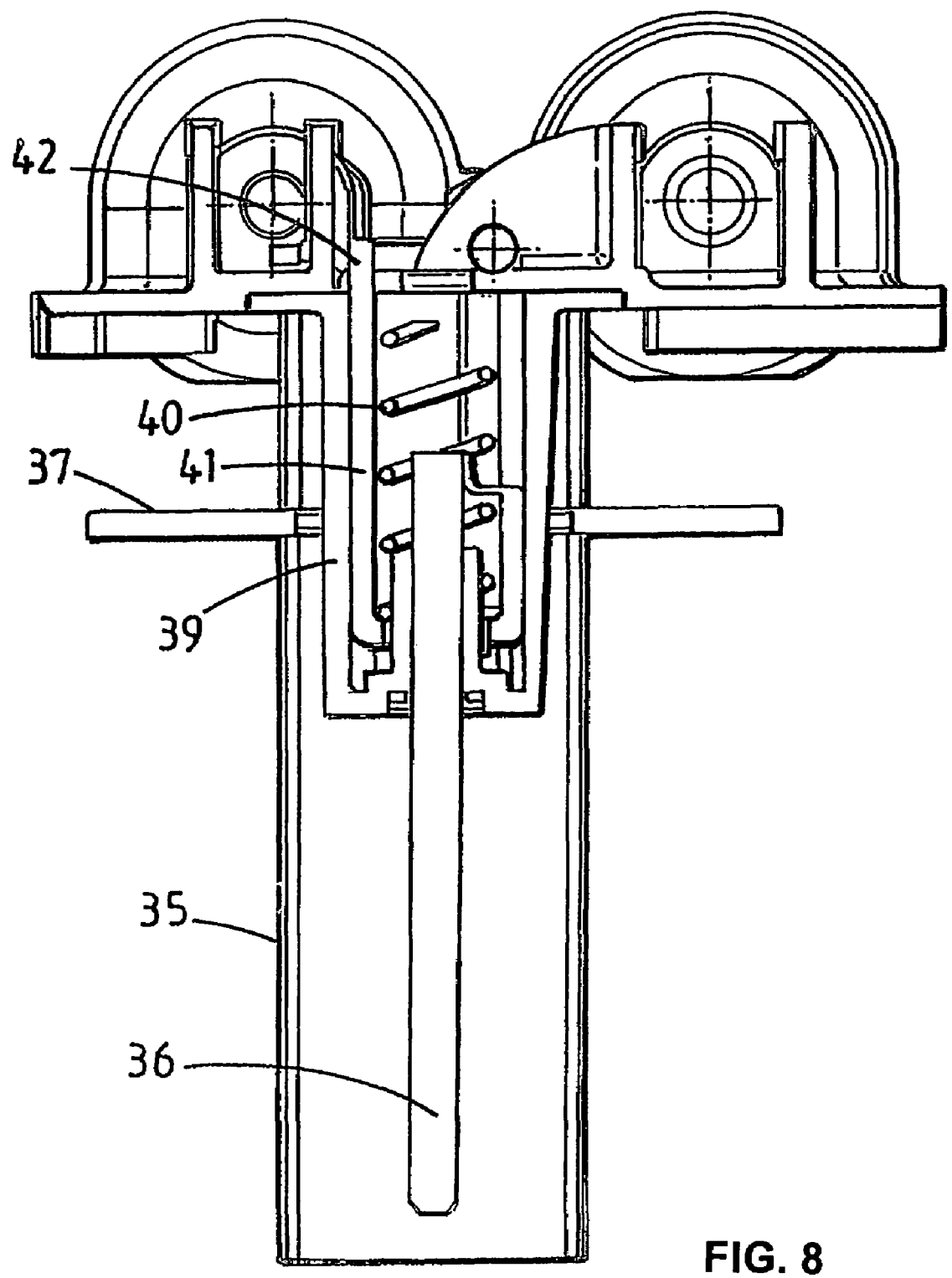
FIG. 8 is a sectional view through the punch assembly of the second embodiment.

Referring to FIG. 8, this shows components of the release plate arrangement shown in FIGS. 6 and 7. The punch 35 is a hollow arrangement within which the guide peg 36 is displaceable. The guide peg 36 is not spring loaded but is simply slidable within an assembly 39 housed within the punch 35. The arms 38 (FIG. 7) which carry the release plate 37 are not visible in the sectional view of FIG. 8. A spring 40 biases a piston 41 downwards as shown in FIG. 8, the piston having an upper portion 42 from which the arm 38 (not shown in FIG. 8) extends to support the release plate 37. The arrangement illustrated in FIG. 8 does not require the provision of slots in the outer surface of the punch 35. FIG. 17 shows an arrangement similar to that shown in FIG. 8, but with the release plate 37 supported on arms 38a that project through slots 37a in the punch 35. It is preferable not to have any such slots so as to reduce the risk of a crushed container becoming stuck on the punch 35.

An appropriate annular seal of for example resilient rubber (not shown) could be provided within the hollow punch 35 and around the peg 36 to prevent fluid entering the punch. It may be appropriate to spring bias the guide peg 36 to a lower position to ensure that the sealing plug does not prevent the guide peg extending downwards when not prevented from doing so by engagement with a container to be crushed.

Figure 9:
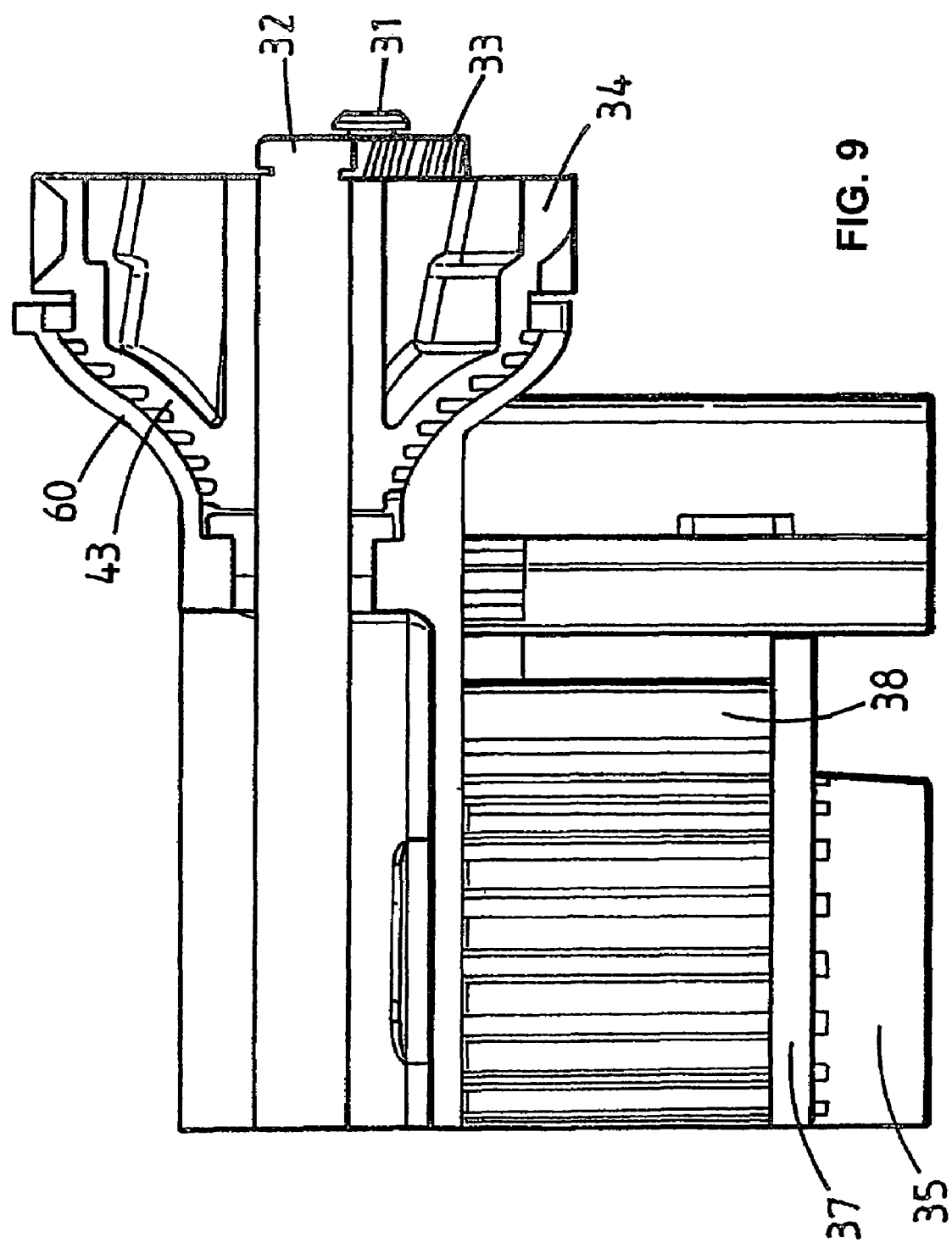
FIG. 9 is a sectional view through a winching arrangement of the second embodiment.
Figure 10:
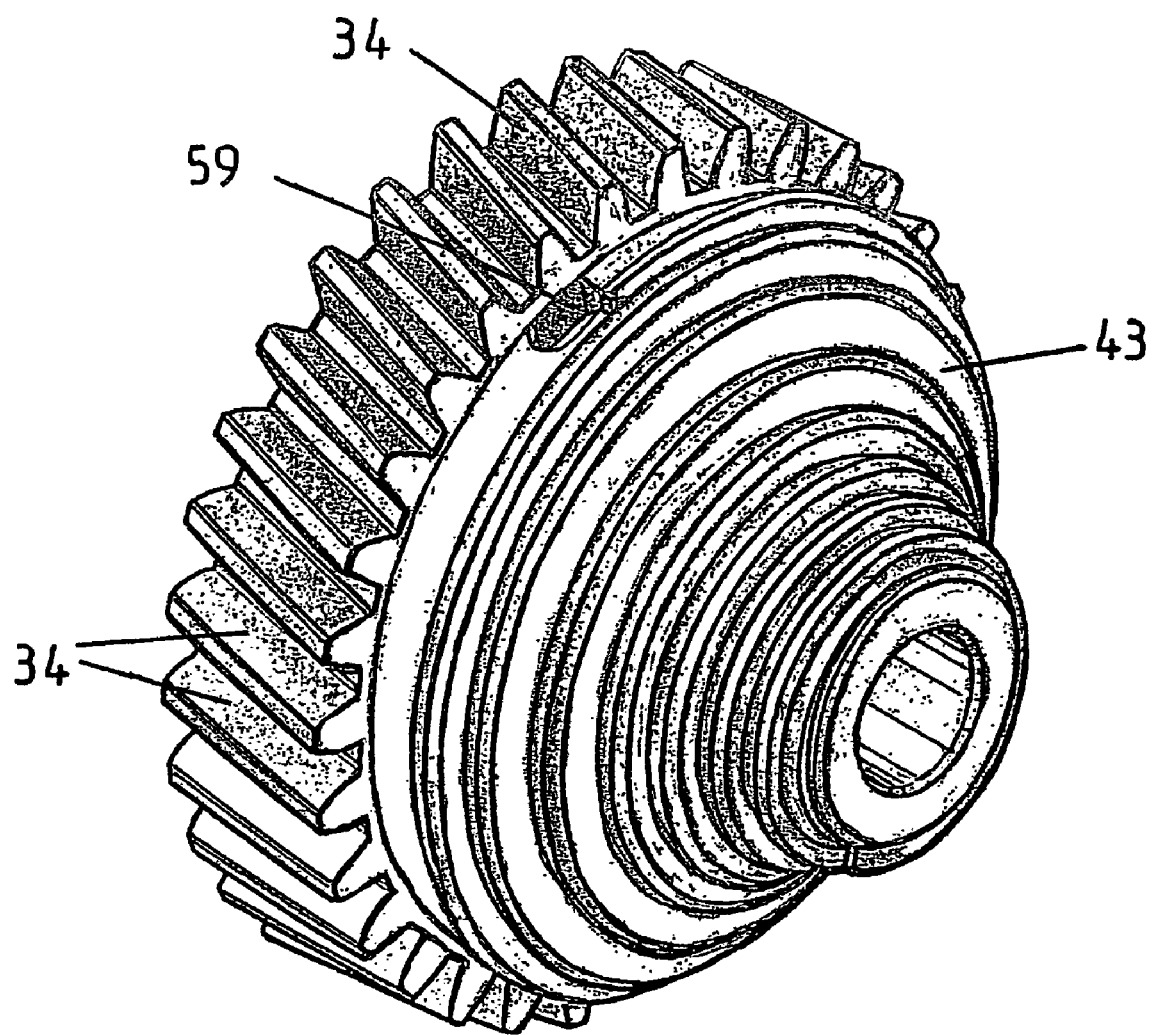
FIG. 10 is a perspective view of a winch incorporated in the second embodiment.

Referring now to FIG. 9, this shows the punch 35, the release plate 37 and the arms 38 which support the release plate 37 and extend parallel to the punch 35. The gears 33 and 34 are also shown. The gear 34 is an integral part of an assembly including a winch 43. The gear and winch assembly 34, 43 is shown in greater detail in FIG. 10. A wire cable (not shown) will be wound around the winch 43 and downwards around a respective roller 29 (see FIG. 7) and back to the upper plate 26. Thus rotation of the shaft 31 will cause rotation of the gears 34 and therefore rotation of the four winches 43 to pull the die carrier 28 upwards. Four spring spool assemblies 44 are shown in FIG. 7, each of these spring assemblies being shown with a spring strip wrapped up around it whereas in use those spring strips would extend upwards to engage the ends of pins on which the rollers 29 are mounted. Thus return of the die to its lowermost position when the support cables are paid out from the winches 43 is ensured.

Figure 11:
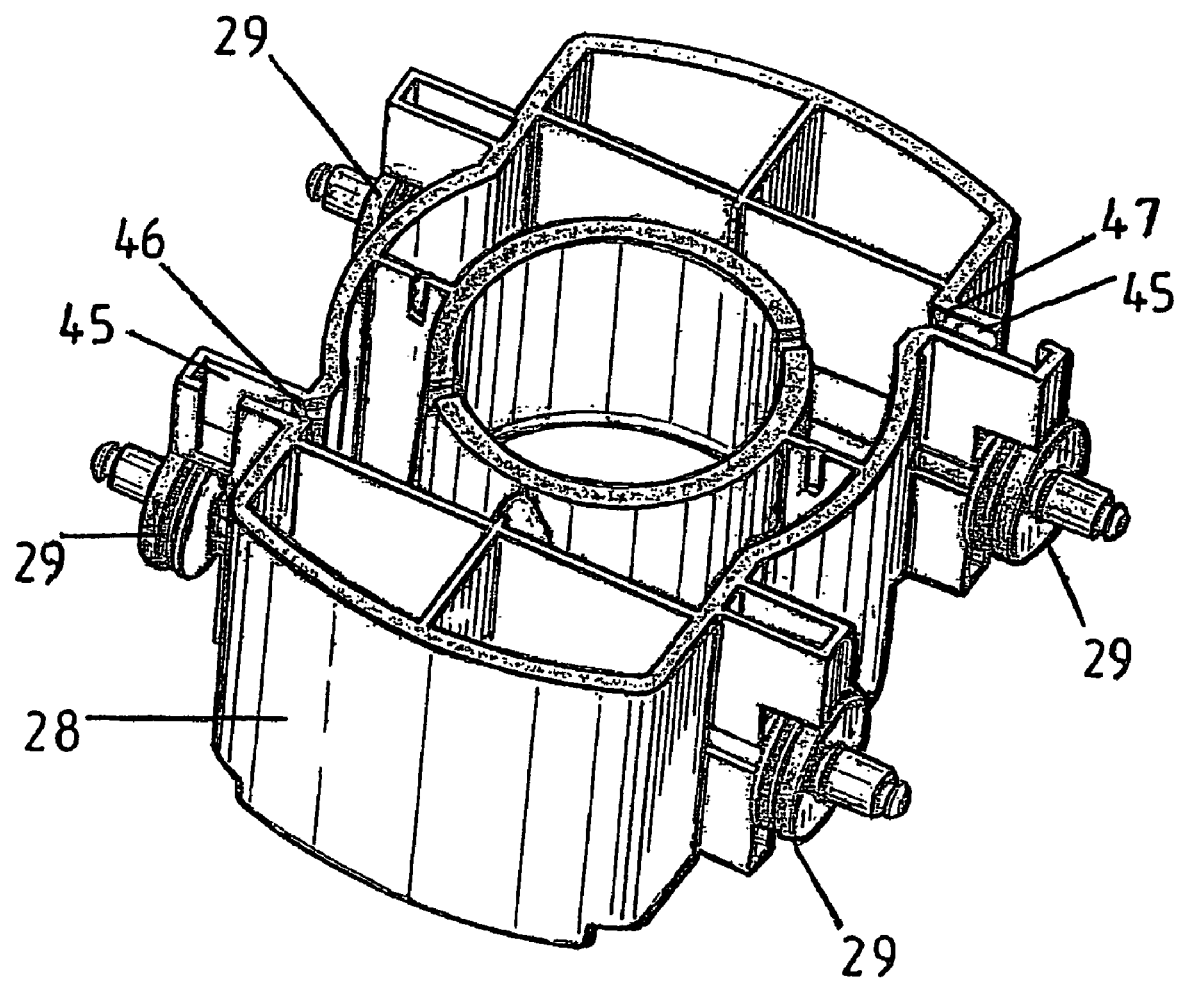
FIG. 11 is a perspective view from below of a die carrier incorporated in the second embodiment of the invention.

FIG. 11 is an underside view of the die carrier 28 showing the rollers 29. The carrier 28 defines two recesses 45 intended to receive respectively an optical transmitter 46 and an optical receiver 47. Light from the transmitter will pass through the illustrated slots defined in the carrier 28 between the transmitter and receiver. Thus an optical beam is established between the transmitter 46 and the receiver 47 which will be cut by the presence of opaque material in the bottom end of the opening in the die. This is used to detect when the die has travelled to a position in which either the punch or material pushed downwards by the punch has reached the bottom of the die opening. The optical devices may be coupled to a control circuit (not shown in FIG. 11) by a flexible cable which will define a loop adjacent one of the metal fabrications 25 (FIGS. 6 and 7).

Figure 12:
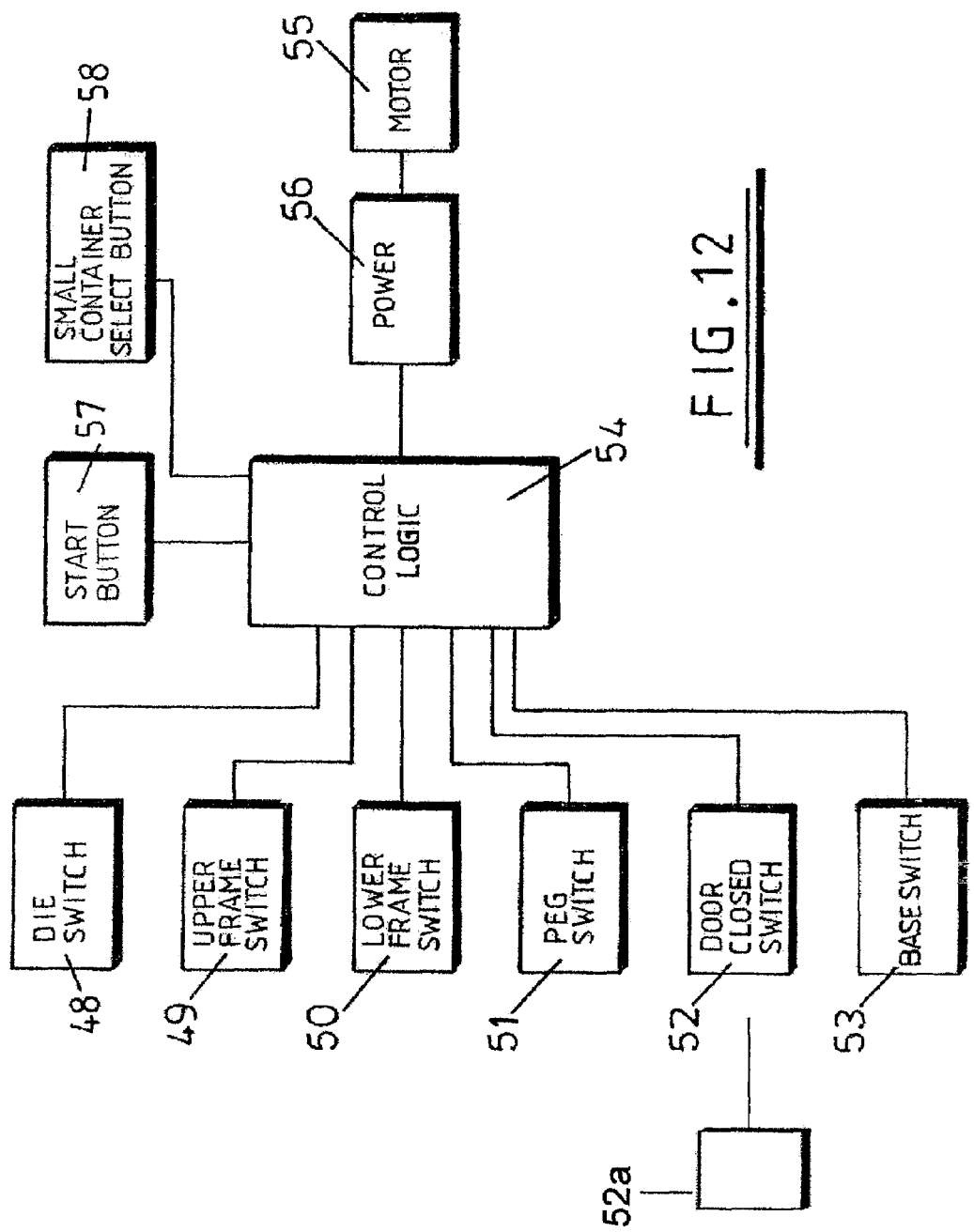
FIG. 12 is a schematic diagram illustrating control circuitry incorporated in the second embodiment.

Referring now to FIG. 12, this illustrates the component parts of one control circuit for controlling the operation of the device illustration in FIGS. 6 and 7. Die switch 48 corresponds to the optical detector described with reference to FIG. 11. An upper frame switch 49 will be provided to detect when the carrier 28 has reached a position on the fabrications 25 in which the upper edge of the die is just beneath the lower end of the punch 35. It is desirable as described below to stop the upwards movement of the die carrier 28 in this upper frame switch position when crushing for example a metal can as it is not desirable to seek to force such a can into the die. A lower frame switch senses the arrival of the die carrier 28 at an intermediate position in which the upper edge of the die is beneath the lower end of the guide peg 36. In this position, the guide peg will not have been displaced upwards assuming that it extends into the neck of and down the length of the body of for example a plastics bottle, whereas if the guide peg 26 is resting on the top of for example a metal can it will have been retracted. Peg switch 51 indicates when the guide peg 36 has been pushed upwards relative to the punch 35.

By looking at the outputs of the lower frame switch 50 and the peg switch 51, an assessment can be made of the type of container placed on the die. If the guide peg 36 base of that container contacts the peg, at which point the die carrier 28 will be above the lower frame switch. If on the other hand the guide peg 36 rests on the top of a container, it will be actuated before the lower frame switch 50 is actuated. A door closed switch 52 is provided simply to prevent displacement of the die carrier 28 until a door 52a has been closed to prevent manual access to the space between the punch 36 and the die carrier 28, and a base switch 53 indicates that the die carrier 28 has been returned to rest on the base 24 (FIG. 6).

Control logic 54 responds to outputs of the six switches 48 to 53 to control the energisation of drive motor 55 by a power supply 56. Operation is initiated by actuation of a start button 57. If it is desired to crush a relatively small container, a further button 58 may be actuated which will raise the die carrier to an intermediate position (for example that shown in FIG. 6 and 7). The die will then be held in that position, enabling opening of the door and the insertion of the relatively small container onto the die carrier 28. Once the door has been closed, the upwards movement of the die carrier 28 can be restarted by actuating the switch 57.

Figure 13:
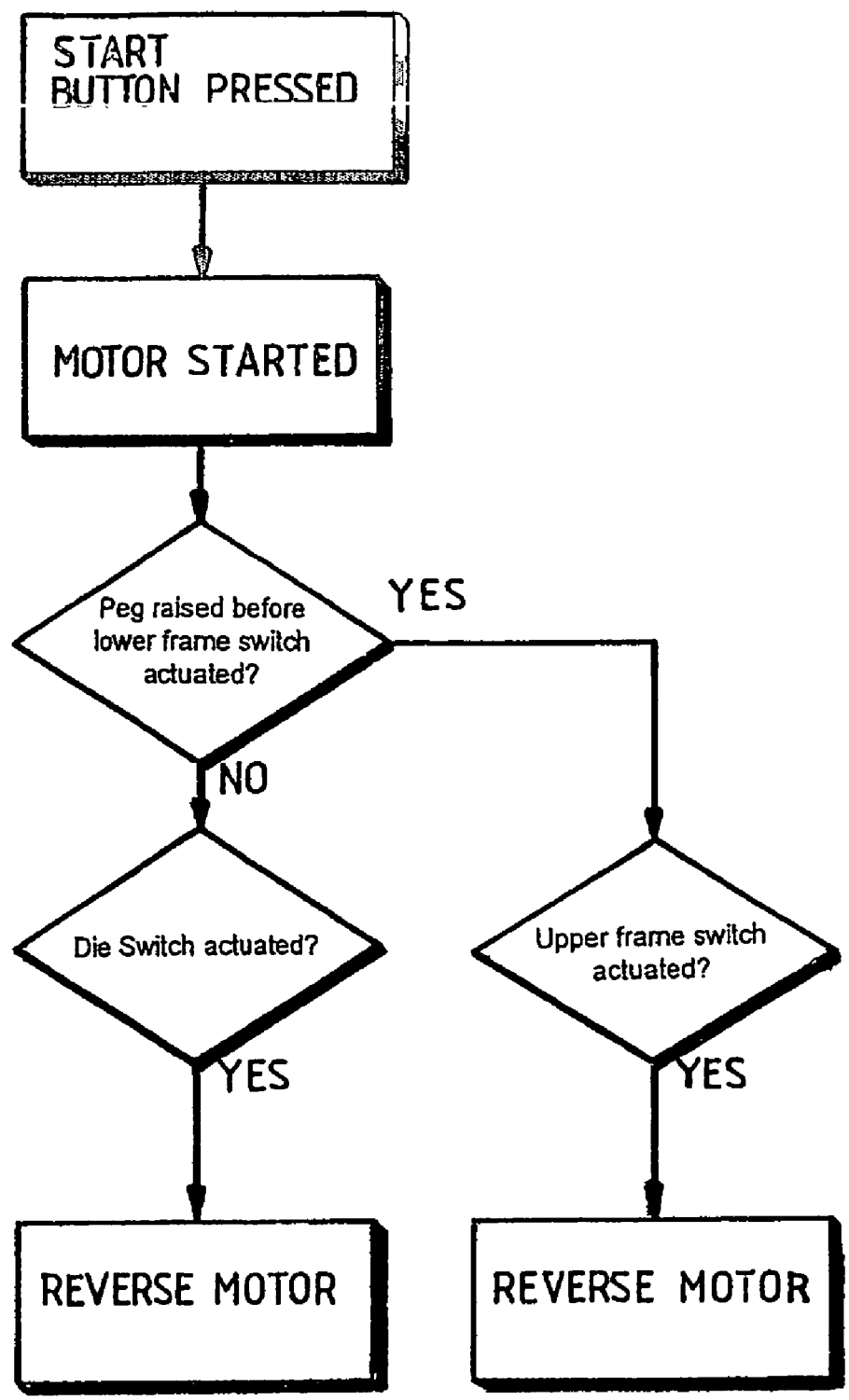

Referring to FIG. 13, this illustrates the response of the control logic to actuation of the lower frame switch 50 and the peg switch 51. When the start button 57 has been pressed, the drive motor will be started and the die carrier 28 will start moving upwards from an initial position resting on the base 24 (FIG. 6). The outputs of the lower frame switch 50 and peg switch 51 are monitored. If the peg switch is actuated before the lower frame switch, the motor is reversed as soon as the upper frame switch 49 is actuated, thus ensuring that the mechanism does not try to force for example a metal can into the die. On the other hand, if the lower frame switch is actuated before the peg switch, the motor continues to drive the die carrier 28 upwards until the die switch 48 is actuated, at which point the motor is reversed. Thus the operation of the mechanism is automatically modified to take into account whether or not the guide peg 36 extends freely into the container to be crushed. After the motor is reversed, the motor continues to operate until the die carrier 28 has been returned to its starting point on the base 24, this being indicated by the base switch 53.

Rather than relying upon an array of three switches 49, 50 and 53 as illustrated in FIG. 12 to determine the die position, the position of the die could be sensed by a linear transducer which would provide a continuous indication of die position rather than simply outputs when the die is at one of three positions. This would make it easier to detect any malfunction of the controller system, e.g. as a result of failure of a single switch.

The rollers 29 may run directly on appropriately shaped surfaces of the fabrications 25, or could run on for example plastics extrusions secured to the fabrications. Ends of the cables (not shown) supported by the winches 43 could simply be folded over and received in appropriate recesses 59 shown in FIG. 10. As in the case of the embodiment of FIGS. 1 to 5, the winches are appropriately tapered to deliver relatively high initial rates of die displacement and slower rates as the die approaches and engages around the punch. As shown in FIG. 9, a casing 60 may be provided which extends close to the surface of the winches 43 so as to reduce the risk of the die support cables becoming disengaged from the appropriate grooves in the winch surface.

Preferably as shown the bottom end of the punch 35 defines a relatively sharp corner as this facilitates collapse of the container to be crushed. The edge could be sharp edged or curved with a very small radius of curvature. The die could be formed from any appropriate material, for example acetal with or without an appropriate filler. The side fabrications 25 may be shaped so as to engage relatively large containers placed between them to assist in the avoidance of buckling of the container as the die is raised.

Having the facility to lift the die to an intermediate holding position makes it easier to place a relatively small bottle in the mechanism with the neck of the bottle engaged by the guide peg 36. This means that even relatively small bottles can be appropriately engaged with the guide peg 36 before the mechanism is fully actuated. A second benefit of the ability to move the die carrier 28 to an intermediate holding position is that, in that position, the casing door can be opened and the space beneath the die carrier can be wiped clean.

Various additional features may be incorporated into the control circuitry. For example, at the end of the rewind travel of the die, that is after the die has been lowered towards the base, a short pulse of energy may be supplied to the motor to pull the die back up again. This provides positive braking and prevents overrunning of the cables which support the die carrier.

What is claimed is:

1. An apparatus for crushing containers, comprising a die defining an opening, a punch, and means for displacing the die and punch relative to each other between a first relative position in which the die and punch are spaced apart such that the container to be crushed can be placed between them and a second relative position in which the punch extends into the die opening to define an annular gap between the punch and die opening, wherein a container crushed between the die and punch as a result of their displacement to the second relative position is at least in part forced into and deformed within the annular gap, and wherein the punch supports a retractable guide peg which may be inserted into a container to be crushed and which retracts as the die and punch move to the second relative position.

2. An apparatus according to claim 1, wherein the punch is fixedly mounted on a frame, and the die is displaceable relative to the frame and punch.

3. An apparatus according to claim 2, wherein the punch extends downwards relative to the frame, and the die is vertically displaceable beneath the punch.

4. An apparatus according to claim 2, wherein the frame supports a fixedly mounted release peg towards which the die is displaced as it is moved towards the first relative position such that the release peg enters the die opening and pushes out any crushed container retained within the opening.

5. An apparatus according to claim 1, comprising a retaining wall to retain a container being crushed between the die and punch.

6. An apparatus according to claim 5, comprising an openable door providing user access for insertion of a container to be crushed between the punch and die, the door defining a retaining wall.

7. An apparatus according to claim 1, wherein the annular gap between the die opening and punch when in the second relative position is between 5 mm and 15 mm.

8. An apparatus according to claim 7, wherein the annular gap is between 5 mm and 10 mm.

9. An apparatus according to claim 7, wherein the annular gap is between 10 mm and 15 mm.

10. An apparatus according to claim 7, wherein the opening has a diameter of from 30 mm to 80 mm.

11. An apparatus according to claim 10, wherein the opening has a diameter of from 50 mm to 70 mm.

12. An apparatus according to claim 1, wherein the die opening has an edge facing the punch of rounded form.

13. An apparatus according to claim 1, wherein the annular gap tapers downwards in a direction in which the punch enters the opening.

14. An apparatus according to claim 13, wherein a diameter of the opening tapers downwards in the direction in which the punch enters the opening.

15. An apparatus according to claim 13, wherein a diameter of the punch tapers towards an end of the punch which enters the opening.

16. An apparatus according to claim 1, wherein the punch and die opening are of circular cross section.

17. An apparatus according to claim 1, wherein the punch and die opening are of generally square cross section and the annular gap is a generally square annular gap.

18. An apparatus according to claim 17, wherein the square cross section defines rounded corners.

19. An apparatus according to claim 1, wherein a surface of the die which extends around the die opening defines formations to retain a base of a container placed thereon.

20. An apparatus according to claim 1, wherein the retractable guide peg supports radially extending retractable container contacting bars.

21. An apparatus according to claim 1, wherein the displacement means comprises a detector for detecting displacement to the second relative position and a controller arranged to initially cause displacement from the first relative position towards the second relative position and to then reverse the relative displacement after the detector detects that the die and punch are in the second relative position.

22. An apparatus according to claim 21, wherein the detector is arranged to detect penetration of material to a predetermined distance within the die.

23. An apparatus according to claim 22, wherein the detector is an optical detector which directs a beam across the die opening and detects obstruction of the beam.

24. An apparatus according to claim 21, comprising means for sensing the position of the guide peg relative to the punch, and means for reversing the relative displacement before the second relative position is reached if the guide peg is retracted when the die and punch are further apart than a predetermined distance.

25. An apparatus according to claim 24, comprising a first sensor for sensing a third relative position when the punch and die are adjacent to each other, the third relative position being intermediate the first and second relative positions, and a second sensor for sensing a fourth relative position intermediate the first and third relative positions, the controller being arranged to reverse a direction of displacement when the third relative position is sensed if the guide peg is retracted before the fourth relative position is sensed.

26. An apparatus according to claim 21, comprising means for selectively controlling the controller to cause relative displacement to a holding position intermediate the first and second relative positions before a container is placed between the die and punch, and means for thereafter causing relative displacement from the holding position to the second relative position.

27. An apparatus according to claim 1, wherein the punch projects through a spring-loaded retractable container release plate.

28. An apparatus according to claim 27, wherein the release plate is supported on one or more arms that project through slots in the punch.

29. An apparatus according to claim 27, wherein the release plate is supported on one or more arms that extend substantially parallel to the punch.

30. An apparatus according to claim 1, wherein the displacing means comprises at least one electric motor driving a plurality of winches to which wires linking the die and punch are connected, rotation of the winches causing relative displacement between the die and punch.

31. An apparatus according to claim 1, wherein the displacing means comprises a single motor that drives four winches each connected by a respective wire to a displaceable carrier of either the die or punch, each wire extending from a respective winch around a pulley supported on the carrier to a support adjacent the winch.

32. An apparatus according to claim 31, wherein at least two of the wires are interconnected and are displaceable relative to the support to balance loads on the wires.

33. An apparatus according to claim 32, wherein two interconnected wires define a loop which extends freely around a surface of relatively large radius such that the wires can slide relative to that surface.

34. An apparatus according to claim 33, wherein means are provided to limit displacement of the loop of wire relative to the surface.

35. An apparatus according to claim 31, wherein the carrier is connected to at least one spring biasing the carrier towards the first relative position.

* * * * *